April 6, 1943.  A. B. CLEVELAND  2,315,770
RECAPPING AND RETREADING MOLD
Filed April 2, 1937  2 Sheets-Sheet 1

INVENTOR.
Arch B. Cleveland
BY Carlos G. Stratton
ATTORNEY.

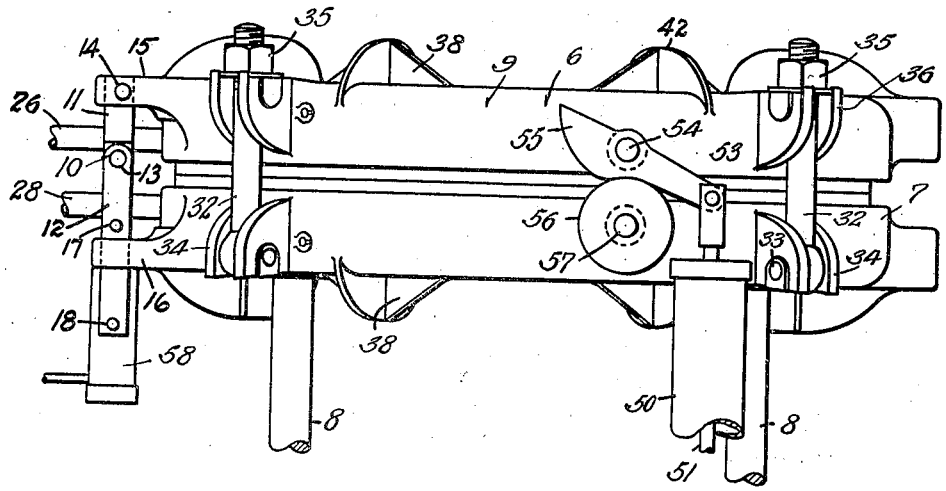
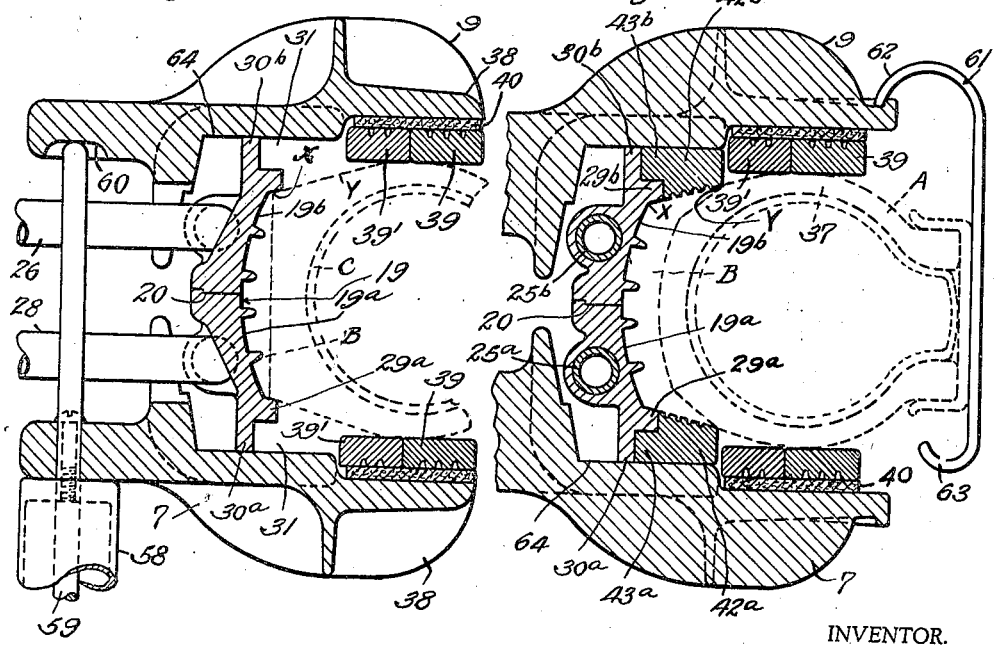
INVENTOR.
Arch B. Cleveland
BY Carlos G. Stratton
ATTORNEY.

Patented Apr. 6, 1943

2,315,770

UNITED STATES PATENT OFFICE 2,315,770

RECAPPING AND RETREADING MOLD

Arch B. Cleveland, Los Angeles, Calif.

Application April 2, 1937, Serial No. 134,493

6 Claims. (Cl. 18—18)

My invention relates to tire vulcanizing molds, and more particularly to a vulcanizing mold that may be used either for recapping or retreading a tire.

In the reclaiming or restoring to active life of worn automobile tires, two methods have been employed, one of these methods being known as "retreading," the essential features of which are the cutting away of a portion of the worn material on the outer road-contacting face or "tread" of the tire and also cutting back and roughening of the material of the "shoulder strip" of the tire (the "shoulder strip" being defined as that portion of the rubber material of the tire which extends along the side of the tire from its junction with the road-contacting face and its junction or union with the thin side wall of the tire) and then completely covering the tread and the shoulder strip with new rubber material to build the tread and shoulder strip back to a predetermined thickness and vulcanizing this new material in place.

The other method is known as "recapping" and is employed in place of retreading whenever the worn tire is worn only along the tread portion and none of the cords or fabric of the tire has been worn through, or the rubber along the shoulder strip is not blistered or broken away from the cords or fabric of the tire. In such instances the tire merely needs additional material placed upon the tread portion and not only is it unnecessary but it is undesirable to extend the new material along the shoulder strip of the tire since during the curing process the application of heat to the undamaged shoulder strip may injure or destroy a portion of the good rubber remaining on the shoulder strip.

Heretofore retreading operations have been performed in what is known as a retreading mold, namely, one in which the matrices employed for the curing of the new tread material extended not only across the tread portion of the tire but a considerable distance down along the shoulder strip thereof, while recapping operations have been performed in what is known as a recapping mold, in which the matrices employed extended only across the road-contacting outer face portions of the tire between the opposite shoulders or corners formed by the junction of the shoulder strip with the road-contacting face or tread and made no substantial contact along the shoulder strip of the tire. It has therefore been necessary to employ two distinctly different types of molds for performing the two distinct operations.

It is therefore an object of my invention to provide a single machine which may be employed for either retreading operations or recapping operations.

Another object of my invention is to provide a machine of the character set forth in the preceding paragraph wherein the same tread matrix may be employed for either retreading or recapping operations, the recapping matrix being convertible from a recapping matrix to a retreading matrix by the mere insertion in the machine of shoulder strip engaging matrix rings cooperating with the tread matrix to extend the effective area of the matrix along at least a portion of the area of the shoulder strip of the tire.

Another object of my invention is to provide a machine of the character set forth in the preceding paragraph wherein removable shoulder strip rings are associated with a recapping tread matrix in such manner as to conduct heat from the recapping tread matrix to desired portions of the side walls of the tire when a retreading operation is indicated.

Another object of my invention is to provide a combined retreading and recapping machine of the character set forth in the preceding paragraphs wherein the matrices are adapted to extend continuously about the circumference of the tire in what is known as a full circle retreading, recapping or molding operation, and in which the matrices are carried by a pair of complementary shell members separable along a plane transverse to the axis of the tire and hinged together in such manner as will permit both a swinging movement of the members relative to each other and also a straight line separation between the members.

Another object is to provide hinge means for a tire vulcanizing mold that will not only articulate the halves of the mold, but also permit movement of one half away from the other half apart from a swinging movement.

Still another object is to provide novel means for opening the mold after the vulcanizing process is completed, and novel means for removing the tire from the mold.

The invention also comprises novel details of construction and novel combinations and arrangements of parts, which will more fully appear in the course of the following description.

In the drawings, like reference characters designate similar parts in the several views.

Figure 2 is a side elevation looking in the direction of the arrow A of Figure 1.

Figure 4 is an enlarged section taken on the line 4—4 of Figure 1, but showing retread rings, hereinafter described, removed.

Figure 5 is an enlarged section taken on the line 5—5 of Figure 1.

Figure 1:
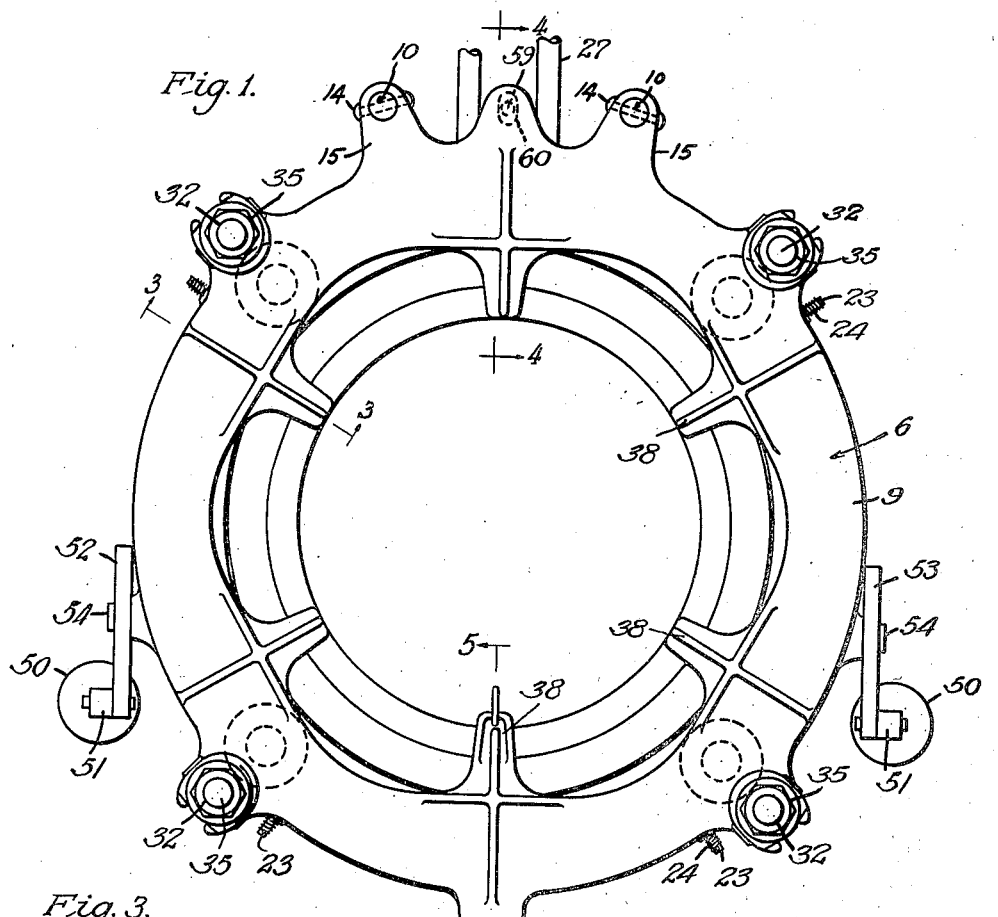
Figure 1 is a plan view of a tire vulcanizing mold embodying features of my invention.

Referring to the drawings, I have illustrated my vulcanizer as comprising a shell or mold 6 of the type known as the full circle mold, that is, the mold comprises an annular ring adapted to receive the entire periphery of a tire and to cure new tread material thereon throughout the full circle described by the tread of the tire in a single operation. The shell 5 is preferably disposed upon a horizontal axis and is formed of a pair of separable complementary halves 9 and 7, the lower half 7 constituting a base half which may be supported at any desired height above a floor by means of a plurality of legs 8. The upper or movable half 9 of the mold is hingedly secured to the lower half as by means of one or more hinges 10, two of which are illustrated herein, each of which comprises an upper hinge member 11 and a lower hinge member 12 pivoted together as shown in Fig. 2, the upper member 11 being rigidly secured as shown at 14 in a radially extending ear 15 formed upon the upper member 9 while the lower member 12 of the hinge 10 is vertically slidable in a radially extending ear 16 formed upon the base half 7, thus adapting the upper half 9 to be swung hingedly away from the base 7 whenever the mold is to be open or toward the base half when the mold is to be closed but permitting considerable latitude of movement of the upper half in a plane parallel to the base half 7 to permit the mold or shell to adjust itself for the reception of tires of different cross sectional diameters, this vertical adjustment of the upper half 9 being limited by means of limit pins 17 and 18 in the lower member 12 of the hinge, disposed respectively on opposite sides of the ear 16.

Figure 3:
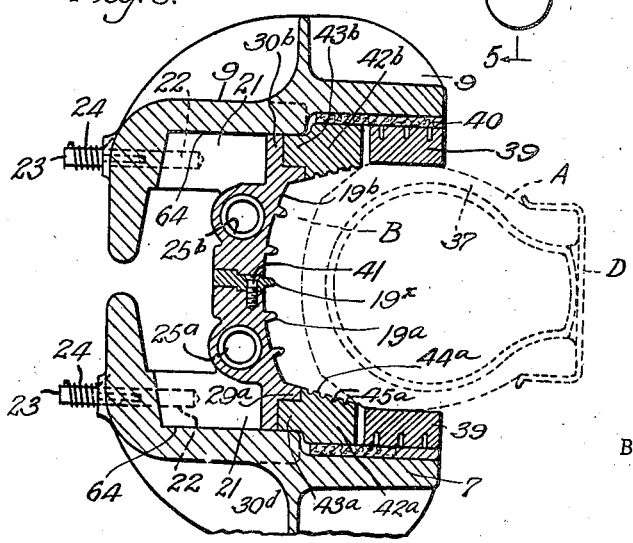
Figure 3 is an enlarged section taken on the line 3—3 of Figure 1.

The mold or shell 6 constitutes the housing and mounting for a recapping matrix 19 to extend across the road-contacting face of the tire between the shoulders thereof, preferably comprising a pair of annular ring members 19a and 19b separated along line 20, the matrix section 19a being secured to the base half 7 of the shell by providing a plurality of radially extending lugs or bosses 21 on the matrix section 19a spaced about the circle described by the matrix section 19a, each of the bosses 21 being provided with a bore or socket 22 adapted to receive the end of a pin 23 extending radially through the outer wall of the shell half 7 (see Fig. 3). The pins 23 are removable but are preferably normally urged toward the sockets 22 by means of springs 24, one end of which engages the pin 23 and the other end of which engages the shell half 7.

The upper matrix section 19b is similarly removably secured to the movable half 9 of the mold so that the matrix section 19b is moved toward and away from the matrix 19a as the mold is closed or opened. Each of the matrix sections is provided with a suitable heating element adapted to supply heat thereto, the heating elements being indicated herein as steam pipes 25a and 25b embedded respectively in the matrix sections 19a and 19b. Steam may be supplied to the matrix section 19b by means of an inlet pipe 26 (see Fig. 1) and exhaust steam removed therefrom by means of pipe 27. Similarly, steam may be supplied to the matrix section 19a through a pipe 28 (see Fig. 2).

In Fig. 4 I have illustrated a tire carcass A which is assumed to have only its road-contacting outer face or "tread" (between the shoulders x—x) worn smooth, but which has not been worn down through the breaker strip or any of the layers of cords or fabric of the tire and hence needs only to have the "tread" portion of the tire rebuilt thereon and to accomplish this the old rubber on the outer road-contacting surface of the tire is roughened up, cement applied thereto and a sufficient number of layers of new rubber material B are placed thereon to build the tread of the tire back to the desired thickness. To cure this new rubber it is necessary to apply heat only to the outer periphery of the tire and it is not desirable to heat the old rubber of the tire along either of the shoulder strips (lying between the shoulders X and the union Y between the shoulder strip and the thin side wall of the tire) or along the side walls thereof.

To adapt my machine for the recapping operations, as hereinbefore described, I provide the matrix section 19a with an inwardly extending radial shoulder 29a and I provide the matrix section 19b with an inwardly extending radial shoulder 29b, the inner surface of the matrix sections 19a and 19b between these shoulders being approximately the width of only the tread or road-contacting portion of the tire so that when a tire to be recapped is placed within the mold 5, as indicated in Fig. 4, the shoulders 29a and 29b will extend down along and make contact with a substantially small area of the shoulder strip of the tire, confining the new tread material to the tread portion of the tire and avoiding the heating or burning of any appreciable amount of the old rubber of the tire. To assist in preventing the heat from extending to the old rubber of the tire, I provide flanges 30a and 30b on the matrix sections 19a and 19b engaging the interior of the shell halves 7 and 9, respectively, providing relatively large air spaces 31 between the shell sections and the side walls of the tire.

As will be understood by those skilled in the art, the curing of tires requires the inflation of the tires so as to press the new rubber material snugly against the surfaces of the matrices and it is the common practice to place an inner tube C within the tire A and to mount the tire upon either an ordinary vehicle road rim D or special rim, prior to the placing of the tire in the mold 6. The upper half 9 of the mold is then drawn downwardly toward the base half 7 by means of a plurality of swing bolts 32, the sliding action of the hinges 10 permitting this operation. The swing bolts 32 are preferably pivotally secured as at 33 to outwardly extending lugs 34 on the base half 7 of the mold while the opposite end of the bolts 32 are provided with nuts 35 which may be screwed down upon outwardly extending ears or lugs 36 formed upon the upper half 9 of the mold.

After the tire has been so placed in the mold and the mold sections clamped together as shown in Fig. 2, the inner tube C is inflated to any desired pressure, pressing the new tread material snugly against the interior surface of the matrices 19a and 19b.

When the tire is inflated, however, there is a tendency for the side wall portions 37 of the carcass of the tire to expand outwardly and to prevent undue expansion of the side walls of the tire I provide a plurality of inwardly extending radial lugs or ears 38 on each of the mold halves 8 and 9, to which may be secured one or more side wall engaging rings 39 and 39', a pad of asbestos or other heat insulating material 40 being interposed between the lugs 38 and the rings 39 and 39' to prevent undue transmission of heat from the shell to the side wall portions of the tire. In this manner the heat of the matrix is prevented from being transmitted to the old rubber of the side walls of the tire.

As will be understood by those skilled in the art, tires are manufactured with different cross sectional diameters and in order to readily adapt my machine for the recapping of tires of different cross sectional diameters, I provide a spacing ring 19x (see Fig. 3) which may be interposed between the meeting faces of the recapping matrix sections 19a and 19b, the surfaces of the ring 19x having offset faces conforming to the offset shape of the faces of the matrix sections 19a and 19b to prevent displacement therefrom and if desired the ring 19x may be secured to the lower matrix section 19a as by means of screws 41. Thus the spacing ring 19x provides a wider tread-engaging portion adapted to receive and cure treads having greater tread widths. By employing spacer rings of varying thickness, the one machine may be readily adapted to cure tires different in diameters between relatively wide limits.

However, it frequently occurs that the tread portion of the tire is so badly worn that a portion of the breaker strip or portions of the cord or fabric structure of the tire have been worn through, in which event to merely "recap" or replace the tread material at the outer periphery of the tire would not be sufficient and in such instances a "retread" operation is performed, this operation including the cutting away or buffing off of the old rubber across the tread portion of the tire and down along the shoulder strips of the tire for a short distance below the corner or junction formed between the tread and the shoulder strips and new rubber material is then placed upon the carcass of the tire to build up both the shoulder strips of the tire and the tread.

My machine is readily adapted to cure tires in such retreading operation by the mere insertion in the machine of a pair of "retreading rings" or "shoulder strip" curing matrices 42a and 42b, the ring 42a being laid upon the inner face of the mold half 7, the shape of the ring 42 including a projecting annular flange 43a adapted to fit within the recess 31 on the matrix 19a so that the upper face 44a of the shoulder strip ring will form a continuous surface with the surface of the matrix 19a. Suitable grooves 45a may be provided on the upper surface of the ring 42a to produce any desired beading or other shoulder design. The shoulder strip ring 42b is similarly placed upon the upper half 9 of the mold, the flange 43b being nested above the shoulder 29b of the matrix section 19b.

With the shoulder strip rings 42a and 42b in place the tire to be retreaded, having new rubber material B' thereon (see Fig. 5) being placed between the mold halves 7 and 9 and the mold halves being clamped together, the inflation of the inner tube C will press new rubber material snugly against the recapping tread matrices 19a—19b and the shoulder strip matrices 42a and 42b. Steam then being applied to the recapping matrices 19a and 19b will heat these shoulder strip matrices, a portion of this heat being conducted to the shoulder strip rings 42a and 42b so as to apply curing heat throughout the entire new tread material. It will be noted, however, that the side wall portions of the tire A are expanded against the rings 39 and 39' which prevents undue expansion of the side walls while at the same time avoids the conduction of heat to the old rubber of the side walls of the tire.

In either the recapping or the retreading operations, as hereinbefore described, after the new rubber has been cured, the removal of the tire from the mold requires the lifting or swinging of the upper half 9 away from the lower half 7. During the curing process there is a tendency for the new rubber to stick to the matrices 19a, 19b or 42a, 42b, so that it is difficult to separate the matrices from the cured tire. I provide a pneumatic opening mechanism for the mold 6 capable of supplying sufficient lifting power to break the matrices loose from the cured rubber. This pneumatic lifting mechanism is illustrated as comprising a pair of pneumatic cylinders 50 arranged on opposite sides of the mold 6 and secured either to the floor on which the legs 8 rest or secured in any desired manner to the base half 7 of the mold. A piston (not shown) having a piston rod 51 is provided for each of the cylinders 50, the upper ends of the piston rods 51 being coupled to a cam lever 53 pivoted at 54 upon the upper mold half 9, the cam surface 55 of which bears upon a roller 56 pivoted as at 57 upon the lower mold half 7. Thus when compressed air or other fluid power is supplied to the cylinder 50, the lifting of the lever 53 will exert considerable lifting pressure, tending to separate the mold halves 7 and 9. If desired, a third cylinder 58 may be provided at the rear of the mold 6, the piston rod 59 of which may press upwardly into a socket 60 formed upon a radially extending ear on the mold half 9. The cylinder 58 should be located more or less centrally between the hinges 10 of the mold 6 so that by applying power to the cylinder 58 at the same time power is supplied to the cylinders 50, a three-point lifting of the mold half 9 will be accomplished. Thus the mold half 9 may be lifted directly upwardly until the matrices have been broken loose from the cured rubber and then the mold half 9 may be swung upon its hinges 10 to completely open the mold and permit removal of the cured tire. Should the tire separate from the upper matrices and not from the lower matrices, a positive separation of the latter may be accomplished by providing a hook-like bar 61, one end 62 of which may engage the mold section 9 while the other end 63 may be adapted to engage the rim D on which the tire is placed. Thus as the mold half 9 is lifted, the hook 61 will positively draw the tire away from the matrices 19a and 29a in the lower half of the mold. The rod 61 is preferably reversible, that is, should the tire stick in the upper half of the mold, a mere reversal of the hook 61 will couple the rim D to the lower mold half 7 so that the lifting movement of the upper half 9 of the mold will positively separate the tire from this half of the mold.

In order to adapt my machine for the ready curing of tires of different diameters, I prefer to form the upper and lower mold halves 7 and 9 relatively deep in a radial direction to provide a substantially wide surface 64, against which the flanges 30a and 30b of the matrices 19a and 19b may bear. Thus by employing a series of interchangeable recapping matrix rings 19a—19b of different diameters, the same mold 6 may be readily employed to cure the tires of large diameters, as shown in Figs. 4 and 5, or smaller diameters, as shown in Fig. 3.

While I have shown and described the preferred embodiment of my invention, I do not desire to be limited to any of the details of construction shown or described herein, except as defined in the appended claims.

Having thus described my invention, what I claim and desire to secure by Letters Patent is:

1. In a vulcanizer for selectively retreading or recapping tires, a shell comprising a pair of complementary annular members defining therebetween an annulus extending about the tread and shoulder portions of a tire, a recapping matrix comprising a pair of complementary annular matrix members which when assembled together extend across the tread portion only of a tire, means securing said matrix members respectively to said shell members, shoulder means on said matrix members adapted to engage the tire at approximately the junction of the tread and shoulder strip portions of the tire, said shoulder means being spaced from said shell members to define therebetween a recess, and a pair of shoulder strip matrices for engaging and curing the shoulder strip portions of a tire to be retreaded, said shoulder strip matrices having flanges receivable in said recess to be supported by said recapping matrix members, said shoulder strip matrices forming with said recapping matrices a continuous matrix for curing the tread and shoulder strip portions of a retreaded tire.

2. In a vulcanizing machine for selectively retreading or recapping tires, a recapping matrix adapted to extend across and engage only the tread portion of a tire lying between the shoulders of the tire to cure a recapped portion only of the tire, and shoulder strip curing matrices removably associated with said recapping matrix to form therewith a substantially continuous matrix extending across the tread portion and downwardly over the shoulder strip portions of the tire to the junction of the shoulder strips with the side walls of the tire, said recapping matrix being constructed and arranged to operate as a complete matrix for a recapping operation.

3. In a vulcanizing machine for selectively retreading or recapping tires, a recapping matrix adapted to extend across and engage only the tread portion of a tire lying between the shoulders of the tire to cure a recapped portion only of the tire, shoulder strip matrices adapted to extend only along the shoulder strip portions of the tire from the shoulders thereof to the junction between the shoulder strip portions and the side walls of the tire, means removably associating said shoulder strip matrices with said recapping matrix to form therewith a substantially continuous matrix extending over both the tread and shoulder strip portions of the tire to cure a retreaded tire, said recapping matrix being constructed and arranged to operate as a complete matrix for a recapping operation.

4. In a vulcanizing machine for selectively retreading or recapping tires, a recapping matrix adapted to extend across and engage only the tread portion of a tire lying between the shoulders of the tire to cure a recapped portion only of the tire, shoulder strip matrices adapted to extend only along the shoulder strip portions of the tire from the shoulders thereof to the junction between the shoulder strip portions and the side walls of the tire, means on said recapping matrix to removably receive and support the shoulder strip matrices, said shoulder strip matrices and said tread matrix forming a continuous matrix extending over the tread portion and shoulder strip portions of a tire to cure a retreaded tire, said recapping matrix being constructed and arranged to operate as a complete matrix for a recapping operation.

5. In a vulcanizing machine for selectively retreading or recapping tires, a recapping matrix adapted to extend across and engage only the tread portion of the tire lying between the shoulders of the tire to cure a recapped portion only of the tire, means associated with said recapping matrix for supplying heat thereto, a pair of shoulder strip matrices removably associated with said recapping matrix to form therewith a substantially continuous matrix extending across the tread portion and over the shoulder strip portions of the tire to cure a retreaded tire, said shoulder strip matrices forming metallic contact with said recapping matrix whereby said shoulder strip matrices are heated solely by conduction of heat from said recapping matrix, said recapping matrix being constructed and arranged to operate as a complete matrix for a recapping operation.

6. In a vulcanizing machine for selectively retreading or recapping tires, a recapping matrix adapted to extend across and engage only the tread portion of the tire lying between the shoulders of the tire to cure a recapped portion only of the tire, means associated with said recapping matrix for supplying heat thereto, a pair of shoulder strip matrices removably associated with said recapping matrix to form therewith a substantially continuous matrix extending across the tread portion and over the shoulder strip portions of the tire to cure a retreaded tire, said shoulder strip matrices forming metallic contact with said recapping matrix whereby said shoulder strip matrices are heated by conduction of heat from said recapping matrix, said recapping matrix being constructed and arranged to operate as a complete matrix for a recapping operation.

ARCH B. CLEVELAND.